(12) United States Patent
Ochi et al.

(10) Patent No.: US 8,023,367 B2
(45) Date of Patent: Sep. 20, 2011

(54) OBJECTIVE LENS ACTUATOR AND DISC DRIVE EMPLOYING THE OBJECTIVE LENS ACTUATOR

(75) Inventors: Manabu Ochi, Hitachinaka (JP); Katsuhiko Kimura, Kasumigaura (JP); Takahiro Yamaguchi, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/781,880

(22) Filed: May 18, 2010

(65) Prior Publication Data

US 2010/0302928 A1 Dec. 2, 2010

(30) Foreign Application Priority Data

Jun. 2, 2009 (JP) ................................. 2009-132655

(51) Int. Cl.
*G11B 7/00* (2006.01)
(52) U.S. Cl. .................................. 369/44.15; 369/44.14
(58) Field of Classification Search .... 369/44.14–44.16, 369/44.22; 359/8.11, 819, 822, 823
See application file for complete search history.

(56) References Cited

U.S. PATENT DOCUMENTS

| 7,219,358 B2 * | 5/2007 | Suzuki et al. ................. 720/682 |
| 7,729,213 B2 * | 6/2010 | Ishii ........................... 369/44.15 |
| 2001/0055265 A1 * | 12/2001 | Obara ...................... 369/112.23 |

FOREIGN PATENT DOCUMENTS

| JP | 10-222858 | 8/1998 |
| JP | 11110780 A * | 4/1999 |

* cited by examiner

*Primary Examiner* — Thang Tran
(74) *Attorney, Agent, or Firm* — Antonelli, Terry, Stout & Kraus, LLP.

(57) ABSTRACT

An object lens actuator can improve workability and operate with high reliability by prevention of damage to the object lens actuator and a disc and sticking of a moving part caused by an excessive movement of the moving part. In a disc drive employing the object lens actuation, stable writing/reading operation is implemented by always keeping a focal point of an object lens at a predetermined track of a recording surface of the disc even when being under the action of external perturbations such as a vertical deviation or a radial deviation of the disc, resulting in improved reliability. A solder-flux adhesion prevention gadget is provided between a substrate and a stopper receiving face, which may include a stepped stage, a partition protruding from the surface of the lens holder, or alternatively a combination of them arranged in order in the range.

10 Claims, 3 Drawing Sheets

OBJECTIVE LENS ACTUATOR AND DISC DRIVE EMPLOYING THE OBJECTIVE LENS ACTUATOR

BACKGROUND OF THE INVENTION (1) Field of the Invention

This invention relates to an object lens actuator which drives an object lens in a focusing direction or a tracking direction to position the focal point of the object lens to a target track on the recording surface of an optical disc for the purpose of reading/writing information from/to the recording surface of the optical disc.

(2) Description of the Related Art

For a higher data transfer rate, a disc drive which writes information to a disc-shaped information recording medium or reads information written on the medium is designed to rotate an optical disc at higher speed. For this purpose, the disc drive is mounted with an objective lens actuator which drives an objective lens in a focusing direction or a tracking direction to allow the focal point of the object lens to follow the track of the disc for the accurate writing/reading of information.

A typical object lens actuator includes a magnetic circuit including a yoke and permanent magnets, an object lens, a focusing coil, a tracking coil, a lens holder including them, and a linear support member which has one end fixed to the outer edge of the lens holder and the other end fixed to a stationary element. Of them, the object lens, the lens holder, the focusing coil and the tracking coil form a moving part which is supported movably relative to the stationary element by the support member.

The object lens actuator further includes a stopper member which makes contact with part of the moving part to limit the amount of travel of the moving part toward the disc in order to prevent the moving part to move excessively toward the disc and come into collision with the disc when the moving part is driven in the focusing direction.

In the process of assembling such an object lens actuator, during the soldering step, a solder flux oozes or flies, so that the solder adheres to the surface of a component. In particular, if the solder adheres to the stopper member or the contact surface of the moving part with the stopper member, the moving part and the stopper member may possibly stick to each other when the moving part moves excessively toward the disc to come into contact with the stopper member, which implies an impossibility of controlling the focal point of the object lens.

To solve this problem, an object lens actuator is known from, for example, JP-A No. 10-222858 (claim 1, FIG. 1), in which a protective film is applied to the stopper member in an initial step of the assembling process and then peeled away from the stopper member in the final step so that a solder flux or an adhesive is prevented from adhering to the stopper member in order to prevent the moving part from sticking to the stopper member.

SUMMARY OF THE INVENTION

In the related art, detailed tasks of applying the protective film to the stopper member and peeling it in the final step are required, making the assembling process complicated and therefore possibly causing a reduction in workability.

The present invention provides an object lens actuator capable of improving the workability and operating with high reliability by prevention of damage to the object lens actuator and a disc and sticking of a moving part which are caused by an excessive movement of the moving part. The present invention provides a disc drive employing the object lens actuation capable of implementing stable writing/reading operation to improve the reliability by keeping a focal point of an object lens at a predetermined track of a recording surface of the disc at all times even when being under the action of external perturbations such as a vertical deviation or a radial deviation of the disc.

To accomplish this, an object lens actuator provided according to one embodiment of the present invention includes an object lens focusing light onto a recording surface of an optical disc, a lens holder mounted with the object lens, a focusing coil for operating the lens holder in a focusing direction, tracking coils for operating the lens holder in a tracking direction, a plurality of support members formed in a linear shape and supporting a moving part, which is formed of the object lens, the lens holder, the focusing coil and the tracking coils, to allow the moving part to move relative a stationary element in the focusing direction and the tracking direction, substrates making an electrical connection between leading ends of the support members and the respective focusing and tracking coils by way of soldering, a magnetic circuit including a yoke and magnets for generating magnetic flux in the focusing coil and the tracking coils, a cover having stoppers provided above the yoke and protruding toward the moving part. The lens holder is provided with stopper receiving faces making contact with the stoppers to limit the amount of travel of the moving part in a direction in which the moving part moves toward the optical disc. The object lens actuator further includes a solder-flux adhesion preventing gadget provided in a range from the substrate to each of the stopper receiving faces.

Preferably, the solder-flux adhesion preventing gadget may include a stepped stage in the range from the substrate to the stopper receiving face.

Preferably, the solder-flux adhesion preventing gadget may include a groove in the range from the substrate to the stopper receiving face.

Preferably, the solder-flux adhesion preventing gadget may include a partition protruding from a portion of a surface of the lens holder located at a distance from the substrate and closer to the stopper receiving face in the range from the substrate to the stopper receiving face.

Preferably, the solder-flux adhesion preventing gadget may include a groove and a partition protruding from a surface of the lens holder, the groove and the partition being arranged in order in the range from the substrate to the stopper receiving face.

According to the present invention, it is possible to provide an object lens actuator which is capable of improving the workability and operating with high reliability by prevention of damage to the object lens actuator and a disc and sticking of a moving part which are caused by an excessive movement of the moving part. Also, the object lens actuation is employed in a disc drive, in which stable writing/reading operation can be implemented to improve the reliability by keeping a focal point of an object lens at a predetermined track of a recording surface of the disc at all times even when being under the action of external perturbations such as a vertical deviation or a radial deviation of the disc.

BRIEF DESCRIPTION OF THE DRAWINGS

Embodiments of the present invention will be described in detail with reference to the following drawings, wherein.

DETAILED DESCRIPTION OF THE INVENTION

Embodiments according to the present invention will be described below with reference to the accompanying drawings.

First Embodiment

Figure 1:
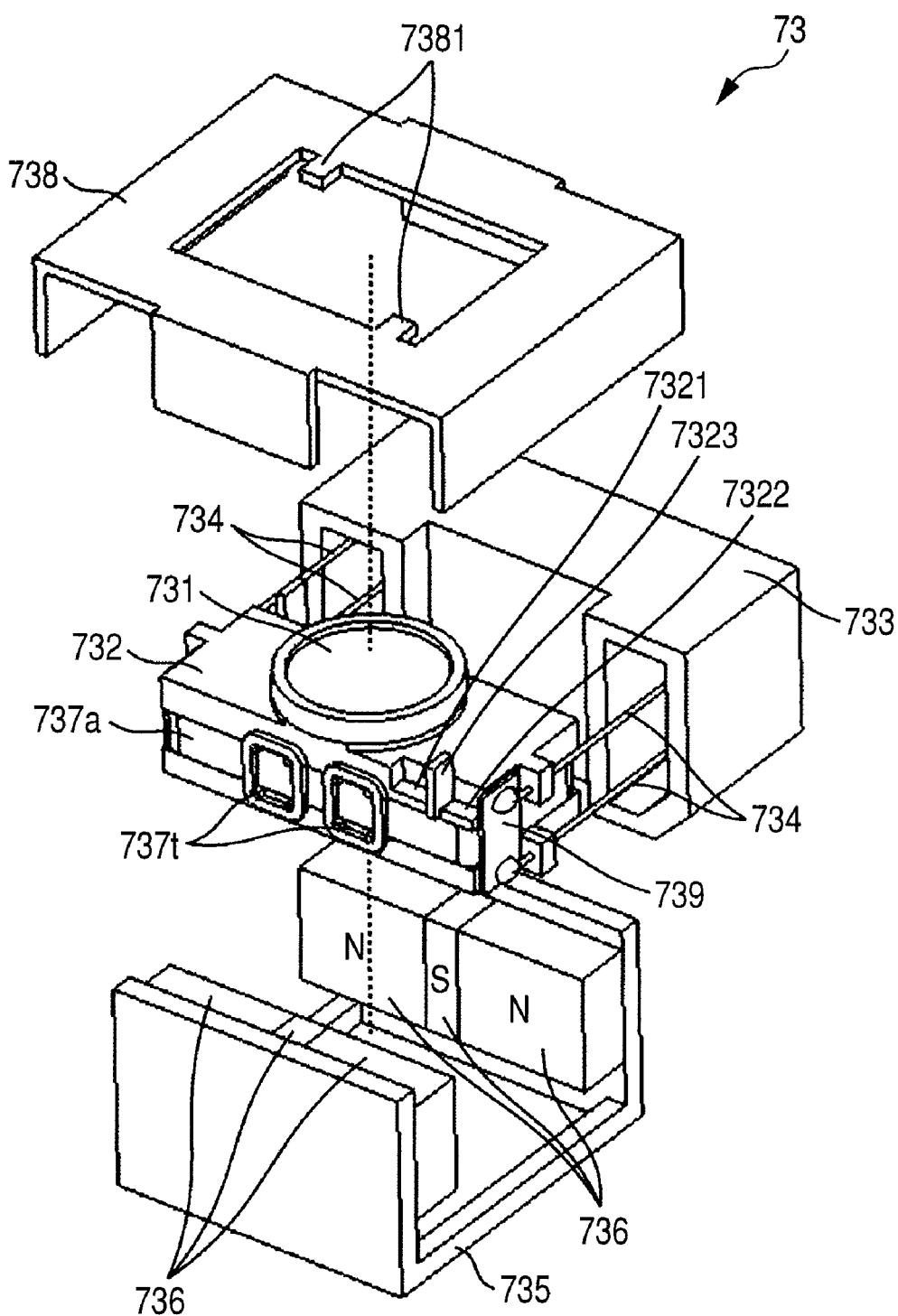
FIG. 1 is a perspective view of an object lens actuator according to one embodiment of the present invention.

FIG. 1 is a perspective view of an object lens actuator 73 according to one embodiment of the present invention.

In the following description, the direction in which an object lens 731 moves toward a disc, not shown, is defined as upward, the upper direction and the like, while the direction in which the object lens 731 moves away from the disc is defined as downward, the lower direction and the like.

In FIG. 1, an object lens actuator 73 includes a magnetic circuit including a yoke 735 and magnets 736, a moving part including an object lens 731 and a lens holder 732 mounted with the lens 731, a stationary element 733 movably supporting the moving part, and linear support members 734 elastically supporting the moving part which is connected to the stationary element 733. The magnetic circuit includes three pairs of the magnets 736 of different widths attached to the yoke 735 which is a magnetic substance such that the two wider magnets 736 and the narrower magnet 736 located between the wider magnets 736 are side-by-side arranged in an alternating polarity arrangement in the tracking direction on each of opposite sides of the moving part.

The first embodiment describes an example that uses the three magnets 736 side-by-side arranged in the alternating polarity arrangement in the tracking direction. However, if a single magnet is magnetized with three magnetic poles of alternating polarities in the tracking direction so that the two opposite wider ends have one pole and the narrower middle portion has the other pole, the same advantageous effects as the example of the first embodiment can be offered.

A focusing coil 737a and tracking coils 737t are wound on the lens holder forming part of the moving part. Each of the support members 734 has one end fixed to a portion close to an end face of the stationary element 733. The support member 734 extends through a hole which is drilled in a protrusion provided on each outer edge of the lens holder, and the other end of the support member 734 is electrically connected to the focusing coil 737a or the tracking coils 737t by way of a substrate 739 by soldering or the like in order to apply external electric current. The support member 734 is also fixed to the lens holder 732 in a position of the hole drilled in the protrusion of the lens holder 732 with an adhesive or the like.

In such a structure, upon passage of electric current through the focusing coil 737a, an electromagnetic force is generated by the action of the magnetic flux from the magnets 736 attached to the yoke 735, which causes the moving part to move relative to the stationary element 733 in the focusing direction. Upon passage of electric current through the tracking coils 737t, an electromagnetic force is generated by the action of the magnetic flux from the magnets 736 attached to the yoke 735, which causes the moving part to move relative to the stationary element 733 in the tracking direction.

The object lens actuator 73 of the first embodiment further includes stopper receiving faces 7321 respectively provided on the opposite side faces of the lens holder 732 facing the magnets 736. The object lens actuator 73 has a mechanism for causing the stopper receiving faces 7321 to come into contact with stoppers 7381 which protrude from a cover 738 mounted on the top face of the yoke 735, to limit the amount of upward travel of the moving part. Accordingly, even if a focusing servo is unlocked by any possibility to allow the moving part to move excessively upward in the focusing direction, the moving part is incapable of moving beyond the amount of travel defined by the stopper receiving faces 7321 and the stoppers 7381, thus avoiding a collision of the moving part with the disc. In consequence, both the object lens actuator 73 and the disc can be prevented from being damaged.

In the process of assembling such an object lens actuator 73, when the support members 734 are soldered to the focusing coil 737a and the tracking coils 737t by way of the substrates 739, the solder flux oozes or flies and adheres to the surfaces of the substrate 739 and/or the lens holder 732. If the solder flux adheres to the stopper receiving face 7321, when the moving part moves excessively upward the focusing direction to cause the stopper receiving face 7321 to come into contact with the stopper 7381, the moving part sticks to the stopper 7381, so that the positioning control on the focal point of the object lens 731 will be made impossible. To avoid this, the first embodiment employs the following structure for the lens holder 732 for the purpose of preventing oozing or flying solder flux from adhering to the stopper receiving face 7321.

The structure of the lens holder 732 will be described below in detail with reference to FIG. 2.

Figure 2:
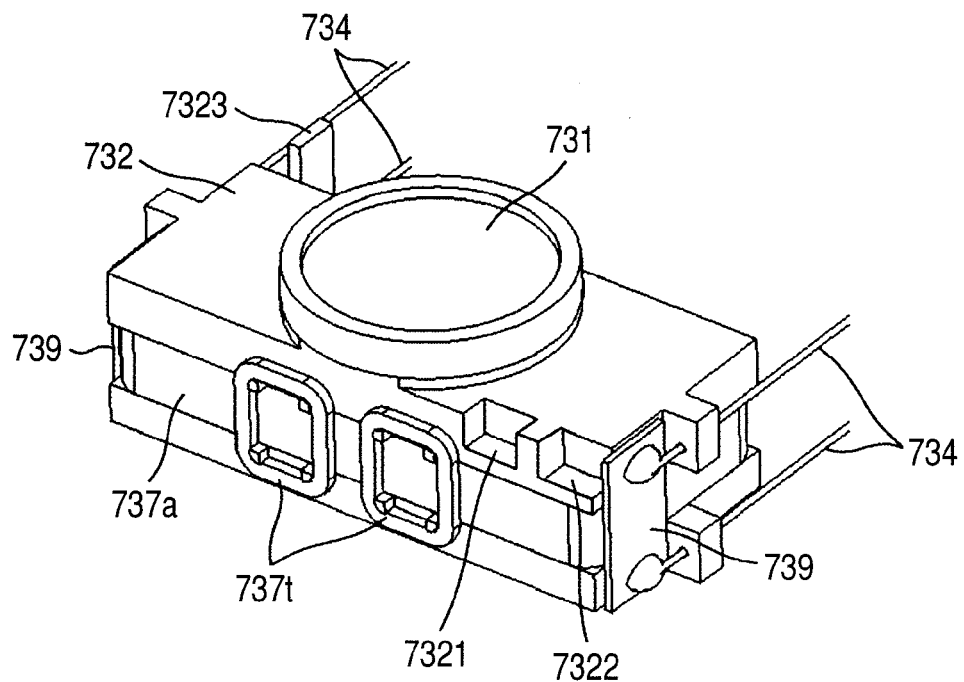
FIG. 2 is a perspective view of a moving part of an object lens actuator according to one embodiment of the present invention.

FIG. 2 is a perspective view of the moving part of the object lens actuator 73 in the first embodiment according to one embodiment of the present invention.

In FIG. 2, the lens holder 732 of the first embodiment advantageously has a stepped stage provided between the substrate 739 and the stopper receiving face 7321 which serves as a gadget that prevents solder flux from adhering to the stopper receiving face 7321. Specifically, a groove 7322 is formed between the substrate 739 and the stopper receiving face 7321.

Because of this advantage, solder flux oozing from the substrate 739 is accumulated in the groove 7322 which is provided between the substrate 739 and the stopper receiving face 7321, so that the oozing solder flux can be prevented from flowing onto the stopper receiving face 7321.

As a result, the sticking of the moving part to the stopper 7381 shown in FIG. 1 is eliminated. That is, an improvement in reliability of the object lens actuator 73 can be achieved by preventing the sticking of the moving part.

In addition, in the first embodiment, the gadget that prevents solder flux from adhering to the stopper receiving face 7321 is implemented through the molding process for the lens holder 732 alone. Therefore, there is no necessity to additionally insert a process requiring detailed tasks of applying protective films to the stopper 731 and the stopper receiving face 7321 and peeling them, resulting in improved workability in the assembling process.

According to the first embodiment, it is possible to provide an object lens actuator capable of improving the workability and operating with high reliability by prevention of damage to the object lens actuator and a disc and sticking of the moving part which are caused by an excessive movement of the moving part.

Second Embodiment

Figure 3:
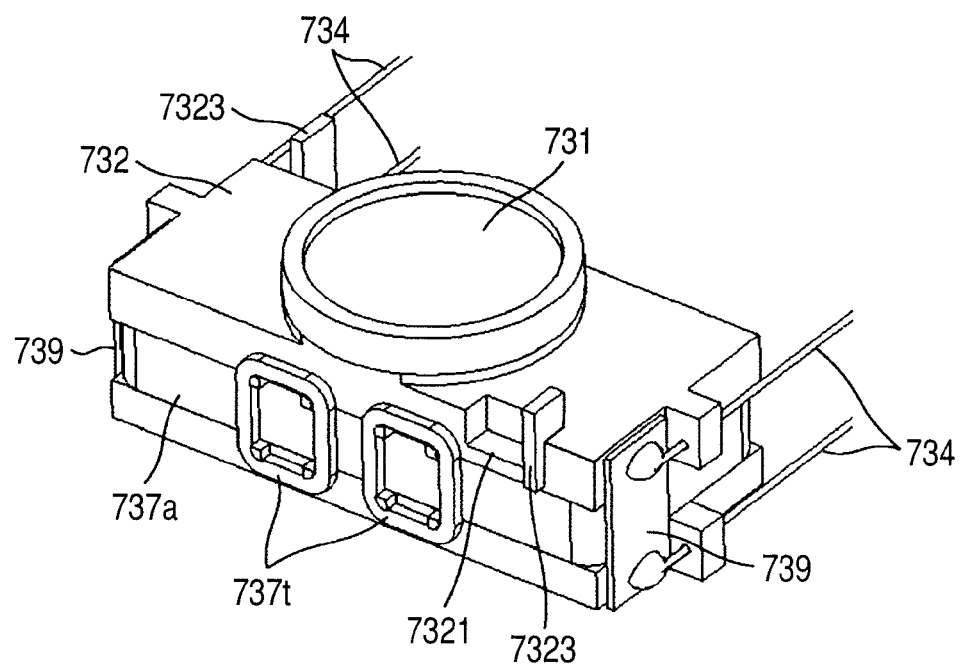
FIG. 3 is a perspective view of a moving part of an object lens actuator according to one embodiment of the present invention.

FIG. 3 is a perspective view of a moving part of an object lens actuator 73 according to second embodiment of the present invention.

The groove 7322 is provided as a stepped stage between the substrate 739 and the stopper receiving face 7321 in the first embodiment. In FIG. 3 second embodiment advantageously has a partition 7323, as a stepped stage, protruding from the surface of the lens holder 732 in a position closer to the stopper receiving face 7321 between the substrate 739 and the stopper receiving face 7321. The structure of the other components in the second embodiment is the same as that in the first embodiment, and the details are omitted.

In the second embodiment, since the solder flux oozing from the substrate 739 is blocked by the partition 7323 provided between the substrate 739 and the stopper receiving face 7321, it can be prevented from flowing onto the stopper receiving face 7321. By placing a partition 7323 at a distance from the substrate 739 to be closer to the stopper receiving face 7321 as described the second embodiment, the solder flux is prevented from oozing directly onto the partition 7323.

In the second embodiment, since the partition 7323 effectively blocks flying solder flux as well as the solder flux oozing from the substrate 739, the adhesion of solder to the stopper receiving face 7321 can be blocked.

Third Embodiment

Figure 4:
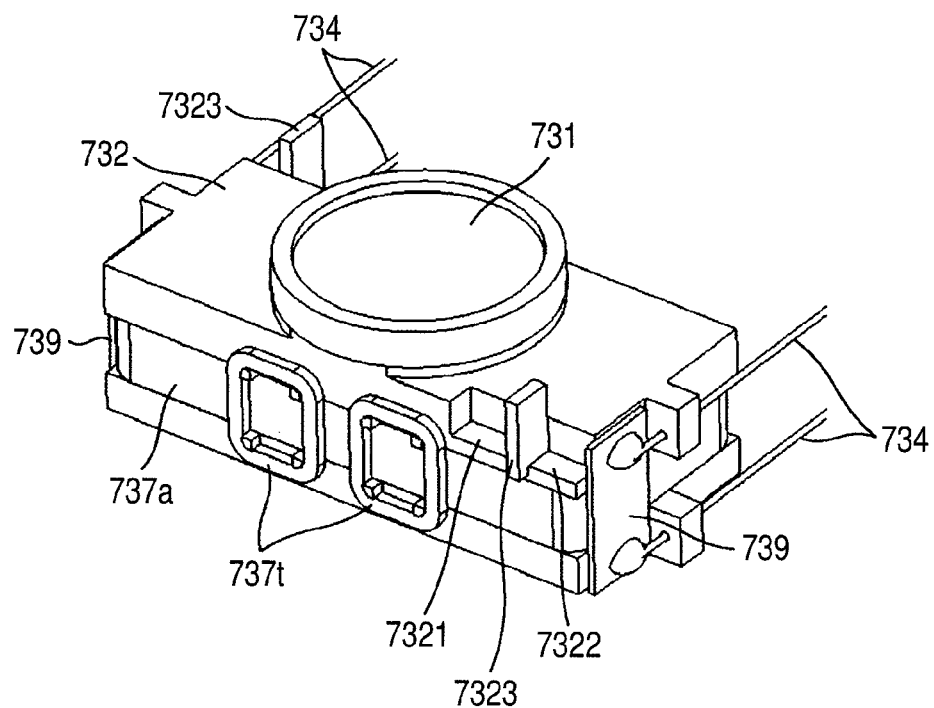
FIG. 4 is a perspective view of a moving part of an object lens actuator according to one embodiment of the present invention.

FIG. 4 is a perspective view of a moving part of an object lens actuator 73 according to third embodiment of the present invention.

In the first and second embodiments, the groove 7322 or the partition 7323 which protrudes from the surface of the lens holder 732 is provided as a stepped stage between the substrate 739 and the stopper receiving face 7321. In the third embodiment, a groove 7322 and a partition 7323, which protrudes from the surface of the lens holder 732, are advantageously provided in order in a range from the substrate 739 to the stopper receiving face 7321. The structure of the other components in the third embodiment is the same as that in the first and second embodiment, and the details are omitted.

With such a structure, since the solder flux oozing from the substrate 739 is accumulated in the groove 7322 provided between the substrate 739 and the stopper receiving face 7321 and the solder flux flying from the substrate 739 is blocked by the partition 7323, the solder flux can be prevented from adhering to the stopper receiving face 7321 with reliability.

Fourth Embodiment

Figure 5:
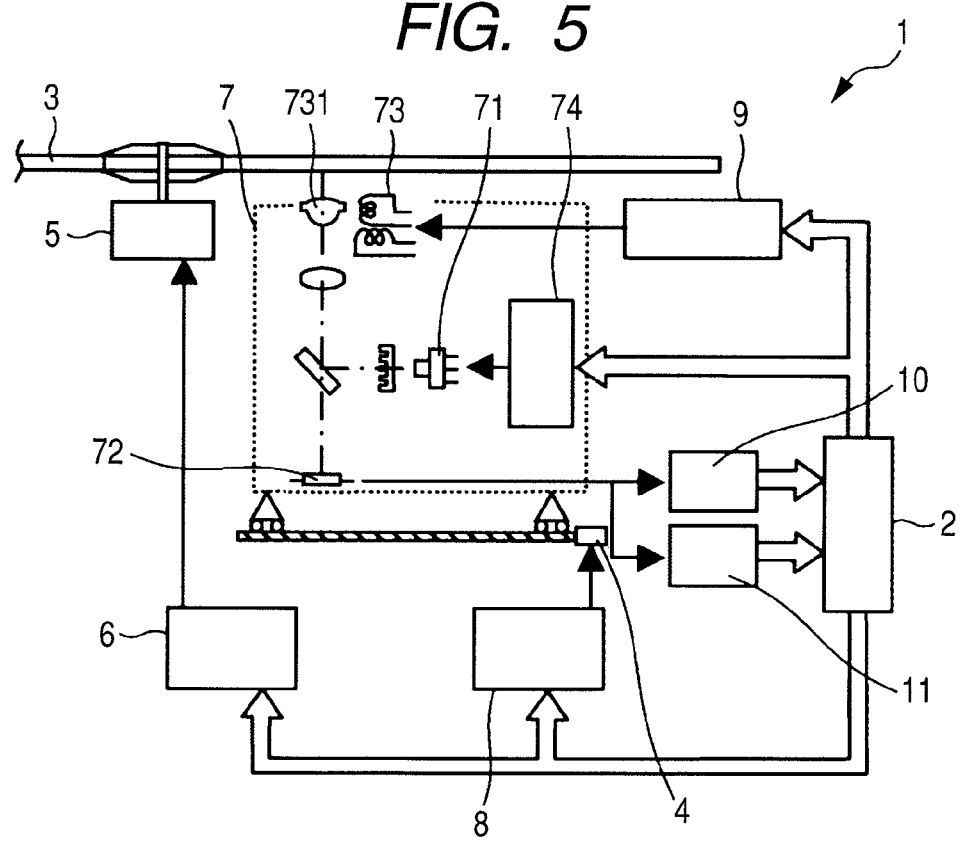
FIG. 5 is a block diagram of a disc drive mounted with an object lens actuator according to one embodiment of the present invention.

FIG. 5 is a block diagram of a disc drive 1 to which the object lens actuator 73 according to one embodiment of the present invention is applied.

In FIG. 5, the disc drive 1 includes a spindle motor 5 that rotates a disc 3, an optical head 7 that reads the information from the disc 3 or writes information to the disc 3, and a signal processing circuit 2 that controls the spindle motor 5 and the optical head 7. The optical head 7 includes the object lens actuator 73 and optical components such as a laser diode 71, a photo-detector 72 and the like. The laser diode 71 is connected to a laser control circuit 74.

In response to an instruction from the signal processing circuit 2, a disc rotation control circuit 6 rotates the spindle motor 5 mounted with the disc 3. In response to an instruction from the signal processing circuit 2, a transfer control circuit 8 drives a feed motor 4 to move the optical head 7 to a predetermined position in a radial direction of the disc 3. A laser drive circuit 74 drives the laser diode 71 to emit light in response to an instruction from the signal processing circuit 2. The laser light emitted from the laser diode 71 is collected onto the disc 3 by the object lens 731. The collected laser light reflects off the disc 3, passes through the object lens 731 and then enters the photo-detector 72. The photo-detector 72 sends a detection signal thus obtained to a servo signal detector circuit 10 and a reading signal detector circuit 11. The servo signal detector circuit 10 generates a servo signal on the basis of the detection signal and transmits the servo signal to the object lens actuating circuit 9. The object lens actuating circuit 9 applies an actuating electric power to the object lens actuator 73 for positioning control for the object lens 731. A reading signal detector circuit 11 generates a reading signal from the detection signal to read the information recorded on the disc 3.

Since the disc drive 1 uses the object lens actuator 73 according to one embodiment of the present invention, it is possible to implement stable writing/reading operation to improve the reliability by keeping a focal point of the object lens 731 at a predetermined track of a recording surface of the disc 3 at all times even if external perturbations such as a vertical deviation or a radial deviation of the disc 3 acts on the object lens actuator 73.

As described above, the present invention is attained by placing a solder-flux adhesion preventing gadget in a range from a substrate to a stopper receiving face. The solder-flux adhesion preventing gadget may be provided by forming a stepped stage in a range from the substrate to the stopper receiving face, and desirably by forming a groove or a partition protruding from the surface of a lens holder in the range from the substrate to the stopper receiving face. More desirably, the solder-flux adhesion preventing gadget may be implemented by forming in order a groove and a partition protruding from the surface of a lens holder in a range from the substrate to the stopper receiving face.

It should be understood by those skilled in the art that various modifications, combinations, sub-combinations and alterations may occur depending on design requirements and other factors insofar as they are within the scope of the appended claims or the equivalents thereof.

What is claimed is:

1. An object lens actuator, comprising:
   an object lens focusing light onto a recording surface of an optical disc;
   a lens holder mounted with the object lens;
   a focusing coil for operating the lens holder in a focusing direction;
   tracking coils for operating the lens holder in a tracking direction, the tracking coils together with the object lens, the lens holder and the focusing coil forming a moving part;
   a plurality of support members formed in a linear shape and supporting the moving part to allow the moving part to move relative a stationary element in the focusing direction and the tracking direction;
   substrates making an electrical connection between leading ends of the support members and the respective focusing and tracking coils by way of soldering;

a magnetic circuit including a yoke and magnets for generating magnetic flux in the focusing coil and the tracking coils;

a cover having stoppers provided above the yoke and protruding toward the moving part, wherein the lens holder is provided with stopper receiving faces making contact with the stoppers to limit the amount of travel of the moving part in a direction in which the moving part moves toward the optical disc; and a solder-flux adhesion preventing gadget provided in a range from the substrate to each of the stopper receiving faces.

2. The object lens actuator according to claim 1, wherein the solder-flux adhesion preventing gadget includes a stepped stage in the range from the substrate to the stopper receiving face.

3. The object lens actuator according to claim 1, wherein the solder-flux adhesion preventing gadget includes a groove in the range from the substrate to the stopper receiving face.

4. The object lens actuator according to claim 1, wherein the solder-flux adhesion preventing gadget includes a partition protruding from a portion of a surface of the lens holder located at a distance from the substrate and closer to the stopper receiving face in the range from the substrate to the stopper receiving face.

5. The object lens actuator according to claim 1, wherein the solder-flux adhesion preventing gadget includes a groove and a partition protruding from a surface of the lens holder, the groove and the partition being arranged in order in the range from the substrate to the stopper receiving face.

6. The disc drive comprising the object lens actuator according to claim 1.

7. The disc drive comprising the object lens actuator according to claim 2.

8. The disc drive comprising the object lens actuator according to claim 3.

9. The disc drive comprising the object lens actuator according to claim 4.

10. The disc drive comprising the object lens actuator according to claim 5.

* * * * *